Figures 1, 2, 3, 4, 5:
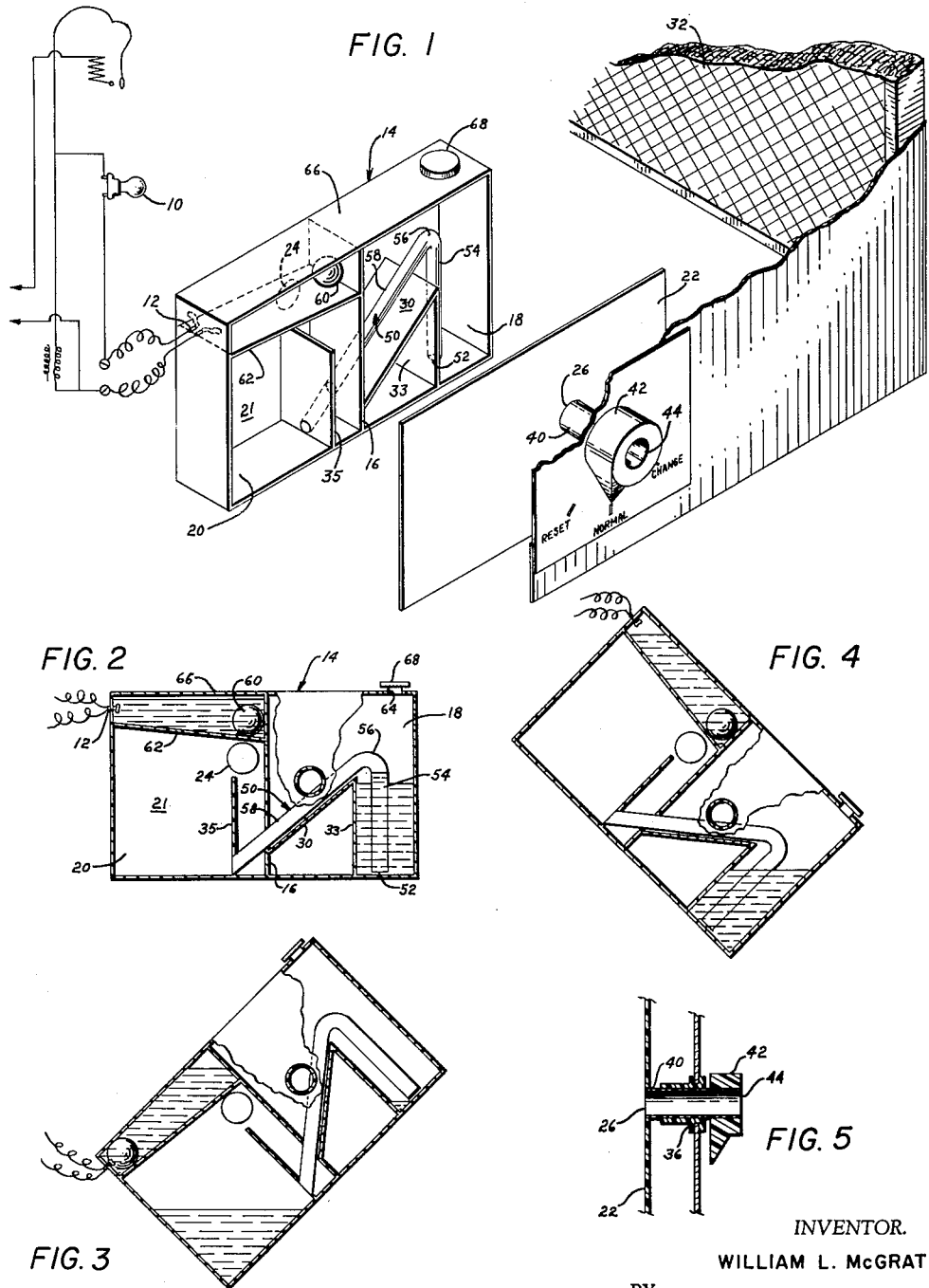

Aug. 7, 1962   W. L. McGRATH   3,048,834
SIGNAL DEVICE
Filed June 2, 1958

INVENTOR.
WILLIAM L. McGRATH
BY
*Herman Seid*
ATTORNEY

United States Patent Office 3,048,834
Patented Aug. 7, 1962

3,048,834
SIGNAL DEVICE
William L. McGrath, Syracuse, N.Y., assignor to Carrier Corporation, Syracuse, N.Y., a corporation of Delaware
Filed June 2, 1958, Ser. No. 739,150
6 Claims. (Cl. 340—240)

This invention relates broadly to apparatus for and a method of measuring a variable pressure relationship in a gas stream. More particularly this invention relates to apparatus for and a method detecting a pressure drop in a continuously flowing stream having a filter interposed therein for the purpose of removing particles of dirt or other solid material from the gas stream. Still more particularly this invention relates to apparatus for and a method of detecting by measurement of the pressure drop through a filter interposed in a gas stream, a condition requiring either replacement of or the cleaning of a filter interposed in the air stream.

The problem of the detection of a dirty or clogged filter employed in an air or gas stream for the purpose of accumulating on the surface thereof dirt or solid material carried in the stream is present in many situations. For example, many residential heating plants of the forced air type employ a filter for the purpose of purifying air flowing through the furnace into the ductwork serving the rooms which form the enclosure. Likewise the problem of detection of a filter which has accumulated thereon an undesirable amount of foreign matter is present in air cooling and ventilating equipment.

The amount of foreign material that may collect on the surface of a filter before becoming undesirable may vary widely with the particular use for which the filter is employed. Once foreign matter accumulates on the surfaces of the filter which define the passages or openings for the flow of gas therethrough a drop in pressure in the gas stream obtains. The reduction in pressure increases in relation to the amount of material collected on the surface of the filter. Eventually the resistance to flow of gas occasioned by the collected material increases to a value where inefficient operation of the equipment utilizing the filter is encountered. Inadequate air or gas supply downstream of the filter or higher power expenditures required to overcome the resistance presented by the clogged or dirty filter are two undesirable effects of dirty filters.

The chief object of this invention is the provision of an improved signal device for detecting the presence of a filter unit in a gas stream which has accumulated on the surface a quantity of solid material from the gas stream in which the filter is interposed, sufficient to require, in the interests of efficient operation, replacement or removal for the purpose of cleaning the filter.

Another object of the invention is a filter signal device of the kind described which may be equipped with signal actuating mechanism arranged to sense a predetermined pressure drop in the air stream as it flows through the filter.

A further object of the invention is the provision of a filter signal actuating mechanism of the kind under consideration which employs a fluid system arranged to create a siphon action to cause positive actuation of the filter signal when such is required.

Another object of the invention is the provision of an improved method employing a pressure condition to create a siphon action sufficient to actuate a control element.

A still further object of the invention is the provision of mechanism operable in response to a variable pressure condition for creating a siphon action in a confined fluid system for the purpose of actuating a control member such as a switch or the like.

These and other objects of the invention are attained with apparatus for energizing a signal indicative of a clogged or dirty filter including means serving as a housing mounted for pivotal movement, a body of fluid withing said housing and means responsive to a predetermined drop in pressure of the gas stream flowing through the filter for creating a siphon action within the housing for transmitting the body of liquid from a first portion of the housing to a second portion of the housing thereby shifting the center of gravity of the housing and the contents to rotate the housing and actuate a filter signal device.

FIGURE 1 is an exploded view with portions thereof shown diagrammatically of a unit illustrating the invention;

FIGURES 2 through 4 inclusive illustrate diagrammatically the operation of the invention; and FIGURE 5 is a side view, partly in section, of an arrangement for mounting the housing used in the invention.

For the purposes of illustration and not limitation the invention will be described as applied to an air conditioning unit adapted to provide relatively cool or warm air to an enclosure.

While the actual signal mechanism may assume any one of many different constructions, the preferred embodiment involves an electric signal such as an illuminated lamp forming part of a circuit including, in addition to a thermostat controlling the unit or apparatus having a filter subject to a differential pressure, a switch actuated by operating mechanism forming the subject of this invention. Lamp 10 is shown in series with switch 12. The circuit including these two elements forms a part of the control circuitry of the air conditioning unit. Illumination of lamp 10 occurs when the normally open switch 12 is closed in response to operation of the switch actuating apparatus.

Preferably switch 12 is located within a housing or casing 14 arranged within the air conditioning unit for limited pivotal movement. The housing includes a partition 16 defining a chamber 18 and a reservoir 20. Disposed within chamber 18 is a body of liquid such as fluid normally used in a draft gauge. Opposed walls 21 and 22 of the housing have openings 24 and 26 in communication with the reservoir and chamber respectively. Opening 24 is arranged to sense pressure downstream of filter 32. Partitions 33 and 35 are arranged in the chamber and reservoir respectively. These partitions terminate short of the top of the housing and confine the liquid within the chamber and reservoir in a manner to be more particularly described. Inclined partition 30 also confines liquid flow.

Hollow hub member 40 extends through a wall of the air conditioning unit so as to sense pressure external of the unit which is indicative of pressure on the side of the filter opposite the side in communication with opening 24. Handle member 42 having an opening 44 therethrough is assembled over and secured to the end of the hub 40 in the manner shown. The hub member 40 is journalled in a bearing 36 mounted in the side of the air conditioning unit. The housing is thus supported on the hub member for pivotal movement relative to the side of the air conditioning unit. The location of the opening 26 is such that when the housing has a charge of liquid within the chamber the center of gravity of the housing and fluid is located to maintain the assembly in the position shown in FIGURES 1 and 2.

Located within the housing 14 to provide communication between the chamber and the reservoir is a tubular member 50. A first open end 52 communicates with the body of liquid in the chamber 18 terminating however short of the bottom of the housing. This open end 52 defines the lower limit of an ascending leg 54 terminating in a rearwardly directed portion 56 located above the level of the liquid in chamber 18 and projecting through an opening in the partition 16. Descending leg 58 terminates in the reservoir to complete the tubular member 50. Inclined track 62 is located in the upper part of the reservoir 20 and serves to permit movement of metal ball 60 in a manner to be later described. The area defined by the top and sides of housing 14, track 62 and central partition 16 may be filled with oil if desired to prevent oxidation of the ball 60. Opening 64 in the top wall 66 of the housing receives plug 68. The fluid used in the mechanism is introduced through the opening 64.

Considering the operation of the filter signal device it will be understood that the air conditioning unit illustrated for the purpose of describing the invention includes a filter, through which air is drawn into the unit under the influence of a fan, and which may be any one of a number of constructions suitable for purpose but which includes a plurality of surfaces, formed to define a plurality of passages therebetween, which serve to collect solid matter carried into the unit.

During operation of the air conditioning unit solid matter deposited on the surface of the filter accumulates to an extent that the pressure sensed by opening 24 decreases. During this period the pressure upstream of the filter remains substantially constant. Eventually the relationship between the pressure upstream or the pressure external to the unit (sensed in the chamber 18) and the pressure downstream of the filter (sensed in the reservoir 20 and communicating leg 58) becomes such that a siphon action is created as the level of liquid in the ascending leg 54 rises up to the top of the portion 56. The liquid in chamber 18 drains promptly into the reservoir 20. The center of gravity of the housing and its contents shifts so that pivotal movement of the housing occurs. Steel ball 60 rolls down the track 62 and completes the switch in the circuit controlling illumination of the lamp which, in turn, indicates that the filter needs replacement or cleaning.

Rotation of the housing causes corresponding movement of handle 42 to the position in registry with the portion of the indicia marked "change." In order to reset the switch actuating mechanism after the filter has been cleaned or replaced, handle 42 is rotated clockwise to the "reset" position and held manually in that position. This rotates the housing beyond its normal position in order to permit the liquid to drain by gravity from reservoir 20 to chamber 18 and the ball 60 to gravitate to its inoperative position. After the handle has been maintained in the "reset" position for a length of time sufficient for the drainage, it is released and rotates counter-clockwise to the normal position, which has the effect of positioning the housing to once again sense a pressure differential necessary to indicate a requirement for filter replacement.

Preferably the housing is formed of a material having poor electrical conductivity such as plastic so as to form an insulation for switch 12. The oil employed to prevent oxidation of the metal ball 60 may be a dielectric oil.

It will be apparent that the amount of liquid employed along with the dimension of the passages and chamber will determine the magnitude of the pressure difference required to create the desired siphon action. It will also be apparent that the switch actuating mechanism responsive as it is to pressure conditions may be utilized in other applications without departing from the spirit of the invention.

While I have described the preferred embodiment of the invention it will be understood that the invention is not limited thereto so that it may be otherwise embodied in the scope of the following claims.

I claim:

1. Apparatus for indicating the presence of a pressure drop of a predetermined magnitude through a filter interposed in a gas stream for the purpose of accumulating solid material carried by the gas stream, comprising signal means; and signal actuation means including a shiftable housing, a fluid system in said housing, means positioned within said housing providing a path of flow for said fluid system by virtue of siphon action, and means sensing a change in pressure of the gas stream flowing through the filter, said last-mentioned means being operative in response to a predetermined pressure change to effect, in conjunction with said flow path means, transfer of substantially the entire body of fluid in said fluid system by siphon action within the housing to shift the housing and actuate the signal means.

2. The invention set forth in claim 1 wherein said housing includes means for confining the fluid system in a portion of the housing so that the housing and the fluid are positioned to bias the housing in a first position.

3. The invention set forth in claim 2 wherein said fluid system includes an opening providing communication between the fluid system and a source of pressure on one side of the filter and means communicating pressure on the other side of the filter to the surface of the body of liquid.

4. The invention set forth in claim 1 wherein means are provided for manually restoring the actuating liquid to its initial disposition so as to reposition the apparatus.

5. Apparatus for detecting obstruction of passages for the flow of a gas stream through a filter having surfaces defining said passages and which accumulate solid materials flowing in the gas stream, comprising signal means, and signal actuation means including a shiftable housing having a chamber and a reservoir, a body of liquid disposed in said chamber, a conduit having an ascending leg submerged in the body of liquid, a central portion above the surface of the liquid in said chamber, and a descending leg in communication with said reservoir, means in communication with the surface of said liquid for sensing pressure of the gas stream external to the filter, and means in communication with said reservoir for sensing pressure on the other side of the filter, said apparatus being operative in response to a predetermined difference in the pressures being sensed, to create a siphon action sufficient to transmit the liquid in the chamber through said conduit into the reservoir and cause the center of gravity of the apparatus to be displaced thereby shifting the housing to actuate the signal means.

6. Apparatus for producing movement of a type sufficient to actuate a control member comprising a shiftable housing, a body of liquid arranged in said housing to maintain the housing in a first position, means associated with said housing for sensing a variable pressure relationship, and siphon actuated means responsive to a predetermined pressure condition for effecting transfer of the fluid within the housing so that movement of the housing sufficient to actuate a control member occurs.

References Cited in the file of this patent

UNITED STATES PATENTS

| | | |
|---|---|---|
| 2,180,856 | Aikman | Nov. 21, 1939 |
| 2,245,398 | Hill et al. | June 10, 1941 |
| 2,797,274 | Greer | June 25, 1957 |